(12) United States Patent
Mallozzi et al.

(10) Patent No.: US 7,670,683 B2
(45) Date of Patent: Mar. 2, 2010

(54) DAMAGE-RESISTANT EPOXY COMPOUND

(75) Inventors: Meghan L. Mallozzi, Austin, TX (US); Salvatore M. Attaguile, Cedar Park, TX (US); David J. Baratto, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 484 days.

(21) Appl. No.: 11/609,483

(22) Filed: Dec. 12, 2006

(65) Prior Publication Data

US 2007/0148470 A1 Jun. 28, 2007

Related U.S. Application Data

(60) Provisional application No. 60/756,624, filed on Dec. 22, 2005.

(51) Int. Cl.
*B32B 15/092* (2006.01)
*B32B 15/08* (2006.01)
*B32B 27/18* (2006.01)
*B32B 27/28* (2006.01)
*B32B 27/38* (2006.01)
*B05D 3/00* (2006.01)
*C08L 63/00* (2006.01)
*C08L 53/00* (2006.01)

(52) U.S. Cl. .................. 428/418; 428/413; 427/386; 523/400; 525/92 H; 525/529; 525/530; 525/533

(58) Field of Classification Search ............... 428/413, 428/414, 415, 416, 417, 418; 523/400, 455; 525/88, 92 H, 95, 107, 523, 529, 530, 533; 427/386

See application file for complete search history.

(56) References Cited

U.S. PATENT DOCUMENTS

| 5,659,004 | A |   | 8/1997  | Takigawa et al. |        |
|-----------|---|---|---------|-----------------|--------|
| 5,859,153 | A |   | 1/1999  | Kirk et al.     |        |
| 6,111,015 | A | * | 8/2000  | Eldin et al.    | 525/65 |
| 6,784,260 | B2|   | 8/2004  | Yeager et al.   |        |
| 2004/0034124 | A1 |   | 2/2004 | Court et al. |     |
| 2004/0101689 | A1 | * | 5/2004 | Valette      | 428/413 |
| 2005/0032987 | A1 |   | 2/2005 | Fleur        |     |
| 2008/0200589 | A1 | * | 8/2008 | Hubschmid    | 523/436 |
| 2009/0008826 | A1 | * | 1/2009 | Court et al. | 264/331.13 |

FOREIGN PATENT DOCUMENTS

| GB | 1 542 333           |   | 3/1979  |
|----|---------------------|---|---------|
| GB | 1 604 960           |   | 12/1981 |
| WO | WO 96/02586         |   | 2/1996  |
| WO | WO 2005/014699 A1   | * | 2/2005  |
| WO | WO 2005/097893 A1   |   | 10/2005 |

OTHER PUBLICATIONS

Elbs, Hubert, et al.; "Thin Film Morphologies of ABC Triblock Copolymers Prepared from Solution", *Macromolecules* [Published online Jun. 4, 2002]; vol. 35, No. 14 (2002); pp. 5570-5577.

Ritzenthaler, S., et al.; "ABC Triblock Copolymers/Epoxy-Diamine Blends. 1. Keys to Achieve Nanostructured Thermosets", *Macromolecules* [Published online Jul. 9, 2002]; vol. 35, No. 16 (2002); pp. 6245-6254.

Fukunaga, Kenji, et al.; "Self-Assembly of a Lamellar ABC Triblock Terpolymer Thin Film. Effect of Substrates", *Macromolecules* [Published online Mar. 28, 2003]; vol. 36; No. 8 (2003); pp. 2852-2861.

Balsamo, V., et al., "Morphological Behavior of Thermally Treated Polystyrene-*b*-polybutadiene-*b*-poly(ϵ-caprolactone) ABC Triblock Copolymers", *Macromolecules* [Published online May 23, 2003]; vol. 36, No. 12 (2003); pp. 4515-4525.

Ludwigs, Sabine, et al.; "Self-Assembly of Functional Nanostructures from ABC Triblock Copolymers," *Nature Materials* [Published online Oct. 26, 2003]; vol. 2 (Nov. 2003); pp. 744-747.

Dean, Jennifer M., et al.; "Communications to the Editor: Nanostructure Toughened Epoxy Resins", *Macromolecules* [Published online Nov. 11, 2003]; vol. 36, No. 25 (Dec. 16, 2003); pp. 9267-9270.

Ritzenthaler, S., et al.; "ABC Triblock Copolymers/Epoxy-Diamine Blends. 2. Parameters Controlling the Morphologies and Properties", *Macromolecules* [Published online Dec. 13, 2002]; vol. 36, No. 1 (2003); pp. 118-126.

Fustin, C.-A., et al.; "Triblock Terpolymer Micelles: A Personal Outlook", *The European Physical Journal E* [Published online Feb. 7, 2005]; vol. 16 (2005); pp. 291-302.

Suzuki, Jiro, et al.; "Self-Assembly Template During Morphological Transition of a Linear ABC Triblock Copolymer from Lamellar to Gyroid Structure", *Polymer* (2004); <www.sciencedirect.com>; vol. 45; pp. 8989-8997.

Rzayev, Javid and Hillmyer, Marc A.; "Communications to the Editor: Nanoporous Polystyrene Containing Hydrophilic Pores from an ABC Triblock Copolymer Precursor", *Macromolecules* [Published online Dec. 8, 2004]; vol. 38, No. 1 (2005); pp. 3-5.

Ludwigs, S., et al.; "Combinatorial Mapping of the Phase Behavior of ABC Triblock Terpolymers in Thin Films: Experiments", *Macromolecules* [Published online Feb. 3, 2005]; vol. 38, No. 5 (2005); pp. 1850-1858.

Ludwigs, S., et al.; "Phase Behavior of ABC Triblock Terpolymers in Thin Films: Mesoscale Simulations", *Macromolecules* [Published online Feb. 3, 2005]; vol. 38, No. 5 (2005); pp. 1859-1867.

Ludwigs, Sabine, et al.; "One-Dimensional Swelling of a pH-Dependent Nanostructure Based on ABC Triblock Terpolymers", *Macromolecules* [Published online Feb. 22, 2005]; vol. 38, No. 6 (2005); pp. 2376-2382.

Niu, Haijun, et al.; "Amphiphilic ABC Triblock Copolymer-Assisted Synthesis of Core/Shell Structured CdTe Nanowires", *Langmuir* [Published online Mar. 30, 2005]; American Chemical Society; vol. 21, No. 9 (2005); pp. 4205-4210.

(Continued)

*Primary Examiner*—Michael J Feely
(74) *Attorney, Agent, or Firm*—Gregg H. Rosenblatt

(57) ABSTRACT

A composition includes a cross-linkable epoxy resin, a polystyrene-polybutadiene-polymethylmethacrylate tri-block copolymer, and a filler material. The polystyrene-polybutadiene-polymethylmethacrylate tri-block copolymer has a concentration ratio of from about 1:1:1 to about 1:1:1.5.

14 Claims, 1 Drawing Sheet

Fujii, Syuji, et al.; "Synthesis of Shell Cross-Linked Micelles Using Acidic ABC Triblock Copolymers and Their Application as pH-Responsive Particulate Emulsifiers", *Journal of American Chemical Society* [Published online Apr. 28, 2005]; vol. 127, No. 20 (2005); pp. 7304-7305.

Kar, Sritama, and Banthia, Ajit K.; "Synthesis and Evaluation of Liquid Amine-Terminated Polybutadiene Rubber and Its Role in Epoxy Toughening", *Journal of Applied Polymer Science* (2005); vol. 96; pp. 2446-2453.

* cited by examiner

DAMAGE-RESISTANT EPOXY COMPOUND

CROSS REFERENCE TO RELATED APPLICATION

This application claims the benefit of U.S. Provisional Application No. 60/756,624, filed Dec. 22, 2005, the disclosure of which is incorporated by reference herein in its entirety.

FIELD OF THE INVENTION

The present invention is generally related to the field of corrosion protective epoxy coatings. In particular, the invention relates to more flexible and damage-resistant epoxy coatings.

BACKGROUND OF THE INVENTION

Fusion bonded epoxy (FBE) powders and liquid resins are commonly used for corrosion protection of steel pipelines and metals used in the oil, gas, and construction industries. These coatings can be applied to a variety of parts for corrosion protection. Example applications include valves, pumps, tapping saddles, manifolds, pipe hangers, ladders, rebar, mesh, cable and wire rope, I-beams, column coils, anchor plates, chairs, and the like.

The FBE coating should have excellent physical properties to minimize damage during transit, installation, and operation. Damage to the coating can lead to higher potential corrosion of the metallic surface that the coating is protecting and can ultimately lead to a decrease in service life. Because cinders and grit can penetrate into the coating during transportation, the coating should have superior penetration and abrasion resistance. Additionally, the coating should have high impact resistance from back fill or handling equipment during installation. The coated substrate is often bent during installation, for example to fit into the contour of the land, and should be flexible enough to prevent damage to the coating. Occasionally, pipes are put into the ground by direct drilling and should therefore have superior abrasion resistance. In operation, the coating can be exposed to water and other chemicals and should therefore be resistant to these chemicals as well as have good cathodic disbandment.

There have been several attempts to make FBE coatings more resistant to mechanical damage. Typically, the thickness of the overall coating is increased to provide added impact and abrasion absorption. However, as the thickness of the coating increases, the flexibility of the coating decreases. Another conventional approach to increasing the damage resistance of coatings is to increase the filler loading. However, similar to the problem with thicker coatings, higher filler loadings can dramatically decrease the flexibility of the FBE coating. As previously mentioned, the flexibility of the coating is very important during installation, and the coating must be tolerant to bending. The damage resistant coatings currently available require a compromise between toughness and flexibility.

BRIEF SUMMARY OF THE INVENTION

In a first exemplary embodiment of the present invention, a composition includes a cross-linkable epoxy resin, a polystyrene-polybutadiene-polymethylmethacrylate tri-block copolymer, and a filler material. The polystyrene-polybutadiene-polymethylmethacrylate tri-block copolymer has a concentration ratio of from about 1:1:1 to about 1:1:1.5.

In another embodiment, a method of protecting an article includes coating the article with a composition and curing the composition while disposed on the article. The composition includes a cross-linkable epoxy resin, a polystyrene-polybutadiene-polymethylmethacrylate tri-block copolymer, and a filler material. The polystyrene-polybutadiene-polymethylmethacrylate tri-block copolymer preferably has a concentration ratio of about 1:1:1 to about 1:1:1.5.

In yet another embodiment, an article includes a substrate having an outer surface and a coating disposed on at least a portion of the outer surface. The coating includes a cross-linkable epoxy resin and a polystyrene-polybutadiene-polymethylmethacrylate tri-block copolymer having a concentration ratio of about 1:1:1 to about 1:1:1.5. The coating complies with the CSA Z245.20-02-12.11 Flexibility Test at $-30°$ C.

These and other aspects of the present application will be apparent from the detailed description below. In no event, however, should the above summaries be construed as limitations on the claimed subject matter, which subject matter is defined solely by the attached claims, as may be amended during prosecution.

While the figures set forth an embodiment of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale.

DETAILED DESCRIPTION

Figure 1:
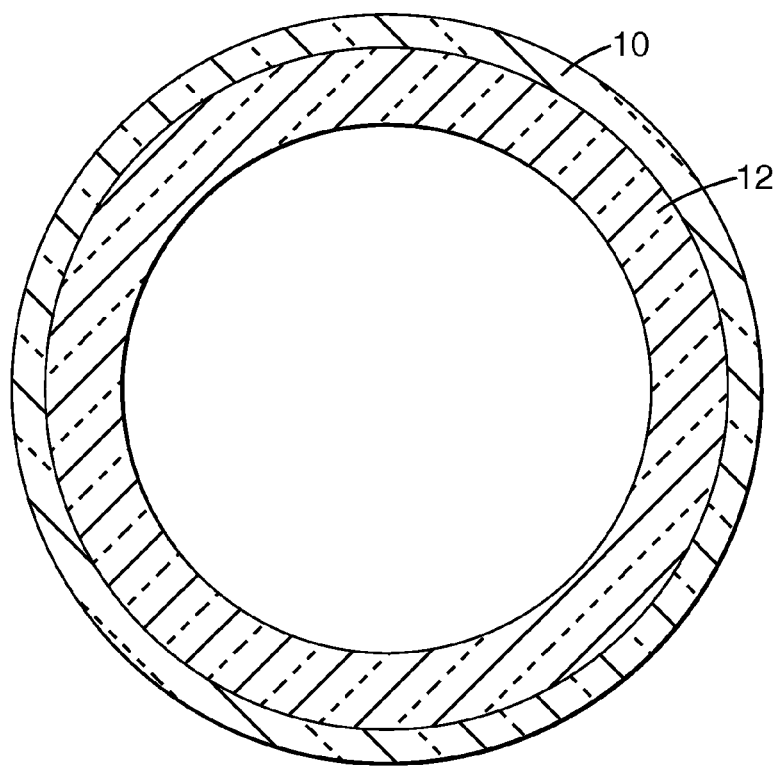
FIG. 1 is a perspective view of a coating disposed on a pipe substrate, in accordance with an exemplary embodiment of the present invention.

FIG. 1 is a perspective view of a coating 10 of the present invention in use with a substrate, for example a pipe 12. Coating 10 is derived from a composition of the present invention that increases the elongation ability of coating 10 without negatively affecting other coating properties, such as the glass transition temperature of coating 10. The elongation ability of coating 10 results in a flexible coating that is damage resistant. Coating 10 can be a single or multi-layer thermoset epoxy coating and can have high impact and abrasion resistance, making coating 10 durable and capable of withstanding the normal wear and tear involved in transportation and use of a pipe 12 or other substrate. Thus, exemplary embodiments of the present invention provide a coating 10 that is a more flexible, damage resistant coating that maintains the toughness needed in extreme environments, such as outdoor pipelines and construction sites.

These above-mentioned characteristics make coating 10 particularly desirable for protecting pipes, rebar, and other metal substrates during transportation and use at construction sites even in extreme environmental conditions. While FIG. 1 is described in reference to a pipe as the substrate, coating 10 can be applied to any metal substrate in which corrosion resistance is a desired characteristic, including, but not limited to: steel pipes, valves, pumps, tapping saddles, manifolds, pipe hangers, ladders, rebar, mesh, cable and wire rope, I-beams, column coils, anchor plates, and chairs.

The composition of coating 10 includes a cross-linkable epoxy resin, a polystyrene-polybutadiene-polymethylmethacrylate tri-block copolymer, and a filler material. Coating 10 formed of the composition has high impact and abrasion resistance as well as increased flexibility. All concentrations herein are expressed in weight percent, unless otherwise stated. Suitable component concentrations in the composition range from about 20% to about 80% cross-linkable epoxy resin, about 1% to about 20% tri-block copolymer, and about 0.001% to about 65% filler, based on the total compositional weight of the composition. Particularly suitable component concentrations in the composition of the present invention range from about 35% to about 70% cross-linkable epoxy resin, about 5% to about 15% tri-block copolymer, and about 30% to about 60% filler, based on the total compositional weight of the composition. Those skilled in the art will appreciate suitable component concentrations ranges for obtaining comparable physical properties of the manufactured articles.

For example, particularly suitable component concentrations in the composition for a pipe substrate, where more damage resistance and less flexibility may be required, range from about 30% to about 70% cross-linkable epoxy resin, about 5% to about 15% tri-block copolymer, and about 30% to about 60% filler, based on the total compositional weight of the composition. In addition, about 0.69% to about 5% of a curing agent can be utilized. In another example, particularly suitable component concentrations in the composition for a rebar substrate, where more flexibility and less damage resistance may be required, range from about 50% to about 80% cross-linkable epoxy resin, about 5% to about 15% tri-block copolymer, and about 3% to about 30% filler, based on the total compositional weight of the composition. In addition, about 0.69% to about 15% of a curing agent can be utilized.

In a preferred embodiment the tri-block copolymer has a polystyrene-polybutadiene-polymethylmethacrylate concentration ratio of from about 1:1:1 to about 1:1:1.5, more preferably about 1:1:1.

Examples of suitable cross-linkable epoxy resins include, but are not limited to: 4-type, 1-type, 7-type, and 9-type Bis-A resins, Novolak resins, and high temperature resins. An example of a particularly suitable cross-linkable epoxy resin includes, but is not limited to, a Phenol, 4,4'-(1-methylethylidene)bis-polymer with 2,2'-[(1-methylethylidene)bis(4,1-phenylene oxymethylene)]bis[oxirane] resins. Commercially available examples of suitable cross-linkable epoxy 4-type Bis-A resins include, but are not limited to: Epon 2004 and Epikote 3004, available from Hexion Specialty Chemicals, Incorporated, Houston, Tex.; DER 664 UE and DER 664 U, available from Dow Chemical Company, Midland, Mich.; Epotec YD 903HE, available from Thai Epoxies, Bangkok, Thailand; NPES-904H, available from Kukdo Chemical Company, Limited, Seoul Korea; GT-6084, available from Huntsman Petrochemical Corporation, Port Neches, Tex.; 6004, available from Pacific Epoxy Polymers, Incorporated, Pittsfield, N.H.; and XU DT 273, GT-9045, and GT-7074, available from Ciba Specialty Chemicals Corporation, Greensboro, N.C. Commercially available examples of suitable cross-linkable 1-type Bis-A epoxy resins include, but are not limited to: Epon 101F, available from Hexion Specialty Chemicals, Incorporated; DER 661, available from Dow Chemical Company; and GT-7071 and GT 9516, available from Ciba Specialty Chemicals Corporation.

An example of a particularly suitable tri-block copolymer includes, but is not limited to: polystyrene-polybutadiene-polymethylmethacrylate (SBM). An example of a suitable commercially available SBM tri-block copolymer includes, but is not limited to, Nanostrength SBM E-20, available from Arkema, Inc., Philadelphia, Pa.

Examples of suitable filler materials include, but are not limited to: inorganic fillers, calcium metasilicate, barium sulfate, calcium sodium aluminum silicate, and calcium carbonate. Examples of suitable commercially available filler materials include, but are not limited to: Vansil W 20 and W 50, available from Vanderbilt R. T. Company, Inc., Norwalk, Conn.; Minspar 3, 4, 7, and 10, available from Kentucky-Tennessee Clay Company, Mayfield, Ky.; Purtalc 6030, available from Charles B. Chrystal Co., Inc., New York, N.Y.; Bariace B-30 and B-34 available from CIMBAR, Cartersville, Ga.; Feldspar G-200, KT4, KT7 available from Feldspar Corporation, Atlanta, Ga.; and Busan 11-M1 available from Buckman Laboratories, Memphis, Tenn.

The composition of coating 10 may also include additional materials in varying concentrations as individual needs may require. For example, the composition may further include curatives or curing agents, pigments, catalysts, flow promoting agents, wax, fluidizing agents, and combinations thereof.

For example, the coating can include from about 0.69% to about 15% of a curative or curing agent. Examples of suitable curatives include, but are not limited to: phenolic hardeners, dicyandiamids, imadazoles, and 3',4'-benzophenone tetracarboxylic dianhydride. Examples of suitable commercially available curatives include, but are not limited to: Dicyandiamid AB 04, available from Degussa Corporation, Parsippany, N.J.; D.E.H. 85 and D.E.H. 87 Epoxy Curing Agent, available from Dow Chemical Corporation, Freeport, Tex.; and Amicure CG, Amicure CG-NA, Amicure CG-325, Amicure CG-1200, Amicure CG-1400, Dicyanex 200-X, Dicyanex 325, and Dicyanex 1200, available from Pacific Anchor Chemical Corporation, Los Angeles, Calif.

Examples of suitable pigments include inorganic and organic pigments. Examples of suitable inorganic pigments include, but are not limited to: carbonates, sulfides, silicates, chromates, molybdates, metals, oxides, sulfates, ferrocyanides, carbon, and synthetics. Examples of suitable organic pigments include, but are not limited to: azo-type, vat-type, and monoazo. Examples of suitable commercially available pigments include, but are not limited to: Titanium Dioxide SMC 1108, available from Special Materials Company, Doylestown, Pa. and Ferroxide Brown 4171, available from Rockwood Pigments, Beltsville, Miss.

Examples of suitable catalysts include, but are not limited to: imidazoles, anhydrides, polyamides, aliphatic amines, and tertiary amines. Examples of particularly suitable catalysts include, but are not limited to: 2-methylimidazole and 2,4,6-tris dimethylamineomethyl phenol. An example of a suitable commercially available catalyst includes, but is not limited to, Epi-Cure P103, available from Hexion Specialty Chemicals, Incorporated, Houston, Tex.

Examples of suitable flow promoting agents include, but are not limited to: degassing or defoaming agents, leveling agents, and wetting agents. Examples of suitable commercially available flow promoting agents include, but are not limited to: Resiflow PL 200, available from Estron Chemical, Incorporated, Calver City, Ky.

Examples of suitable waxes include, but are not limited to: polyethylene wax, synthetic wax, and polytetraflouroethylene. An example of a commercially available polyethylene wax includes, but is not limited to: MPP 620F, available from Micro Powders, Inc., Tarrytown, N.Y.

Examples of suitable fluidizing agents include fumed silicas such as hydrophobic and hydrophilic silicas. Examples of commercially available hydrophobic fumed silicas include, but are not limited to: N20, T30, T40 available from Wacker Silicones, Adrian, Mich; and M5, HS5, E5H, and HP60 available from Cabot Corporation Tuscola, Ill. Examples of commercially available hydrophilic fumed silicas include, but are not limited to: H15 and H18 available from Wacker Silicones, Adrian, Mich.; and CT 1221 available from Cabot Corporation Tuscola, Ill.

The composition of coating 10 has increased flexibility and resistance to cracking when bent. The tri-block copolymer allows coating 10 to withstand cracking when bent at varying degrees per pipe diameter (°/PD) at varying temperatures. The flexibility properties of the compositions of coating 10 are measured pursuant to a bend test provided below in the Examples section of the specification. As is shown below, exemplary embodiments of coating 10 comply with the CSA Z245.20-02-12.11 Flexibility Test at −30° C. Moreover, an example of increased flexibility is the observation of no cracks after bending a sample coated with the composition of coating 10 by 4°/PD at −30° C. Because the composition of coating 10 has increased flexibility, it is less brittle and prone to damage during transportation and use. Coating 10 is thus more durable and capable of withstanding abuse such as bending, even at extreme conditions such as at a temperature of −30 degrees Celsius (° C.)

Figure 2:
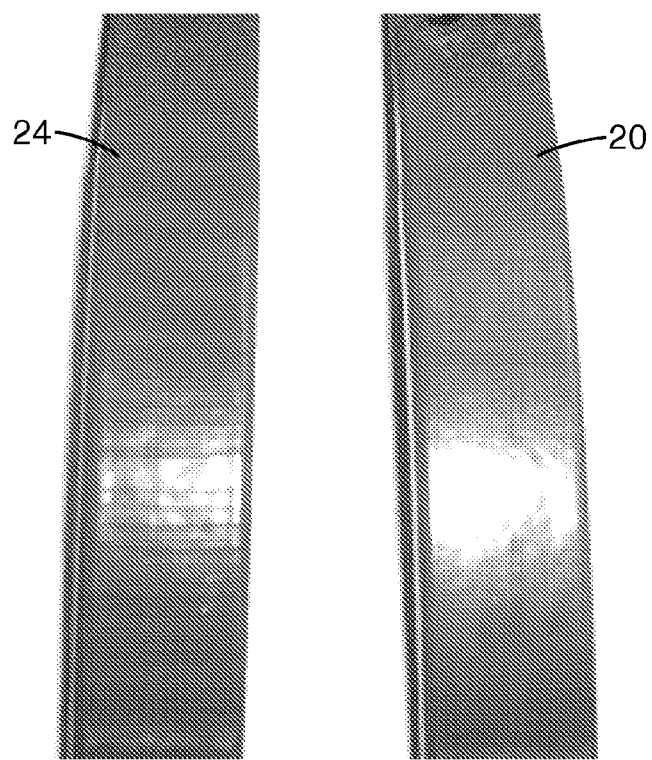
FIG. 2 shows an image comparing a coating similar in composition to a conventional damage resistant coating and a coating formed in accordance with an exemplary embodiment of the present invention.

For example, FIG. 2 shows an image of a coating 24 (having the same composition as Comparative Examples C and D, below) and an image of a coating 20, which comprises a coating made in accordance with the description of coating 10 described above. FIG. 2 shows coatings 24 and 20 after they were subjected to a 4°/PD bend test at −30° C. As can be seen in FIG. 2, coating 24 exhibits numerous hard horizontal cracks observable to the human eye. By contrast, coating 20 exhibits no observable hard cracks.

The composition of coating 10 also has suitable impact and abrasion resistance. The impact and abrasion resistance of the exemplary compositions of coating 10 are measured pursuant to an abrasion test and impact resistance test provided below in the Examples section of the specification. It has been observed that neither the impact resistance nor the abrasion resistance has been negatively affected by the addition of the SBM tri-block copolymer. In accordance with an exemplary embodiment, a FBE coating can be provided where the user no longer has to compromise flexibility and toughness. The mechanical damage resistance of coating 10 is as effective as the mechanical damage resistance of conventional damage resistant coatings. In addition, coating 10 has increased flexibility when compared to conventional damage resistant coatings.

Coating 10 may be made using a mixing and extruding process. In one exemplary embodiment, the resins, filler, and tri-block copolymer (and, for this example, curatives, catalysts, pigments, and flow control agents) are dry blended in a high shear mixer (Thermo Prism model #B21R 9054 STR/2041) at about 4000 revolutions per minute (rpm). After premixing, the samples are melt-mixed using a twelve-inch co-rotating twin screw extruder model #MP-2019 15;1 with 17-90 blocks and 2-60 blocks at a throughput range from about 50-60 grams per minute. The extruded material is then ground and a fluidizing agent, here fumed silica, is added to the desired wt %. The final formulation is then blended again using a high shear mixer at 4000 rpms. After mixing, the material is screened using a sieve with a 60 mesh screen.

The dry powder epoxy is then coated onto preheated (430° F.), grit blasted, near white metal finished, hot rolled steel surfaces using a fluidized bed. The near white metal finish represents metal surfaces that are blasted to remove substantial dirt, mill scale, rust corrosion products, oxides, paint, and other foreign matter. The coating is then coated to a thickness of about 0.02 inches. The coated bars are then post cured for two minutes in a 400° F. oven and water quenched for two minutes.

Thus, exemplary embodiments of the present invention provide a coating composition that is more flexible and damage resistant, providing corrosion resistance to pipe (and rebar and other substrates).

Property Analysis and Characterization Procedures

Various analytical techniques are available for characterizing the coating of the present invention. Several of the analytical techniques are employed herein. An explanation of these analytical techniques follows.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Materials Used
  EPON 2004 and EPON 1001F: epoxy resins, available from Hexion Specialty Company, Houston, Tex.
  Dicyandiamid AB 04: a dicyandiamide curative, available from Degussa Corporation, Parsippany, N.J.
  D.E.H. 85: a phenolic hardener, available from Dow Chemical Co., Freeport, Tex.
  Feldspar G-200: an inorganic filler material, available from Kentucky-Tennessee Clay Company, Mayfield, Ky.
  Vansil W20: an inorganic filler material, available from R.T. Vanderbilt Chemicals, Norwalk Conn.
  Wollastokup 10012: an inorganic filler material, available from NYCO Minerals Inc., Wilsboro, N.Y.
  Huberbrite 10: an inorganic filler material, available from J.M. Huber Corporation, Macon, Ga.
  Zeeospheres G-800, Zeeospheres G-600: a filler material available from Zeelon Industries, St Paul, Minn.
  Nanostrength SBM E-20: a 1,3-Butadiene, styrene, methyl methacrylate polymer having between approximately a 1:1:1 and approximately a 1:1:1.5 ratio of styrene:butadiene:methyl methacrylate, available from Arkema, Incorporated, Philadelphia, Pa.
  Nanostrength SBM E-40: A 1,3-Butadiene, styrene, methyl methacrylate polymer having between approximately a 3:1:2 ratio of styrene:butadiene:methyl methacrylate, available from Arkema, Incorporated, Philadelphia, Pa.
  Nanostrength BA/AMMA M-22: a MAM triblock copolymer having approximately a 3:2 ratio of butyl acrylate:methyl methacrylate, available from Arkema, Incorporated Philadelphia, Pa.
  Epi-Cure P103: a catalyst, available from Hexion Specialty Chemicals, Houston, Tex.
  SMC 1108: a pigment, available from Special Materials Company, Doylestown, Pa.
  Ferroxide Brown 4171: a pigment, available from Rockwood Pigments, Beltsville, Md.

Resiflow PL 200, PF 67, Resiflow PH-240, Resiflow PH-241, Resiflow P-65F, Resiflow LFMBE-6, Octoflow St-70: flow control agents, available from Estron Chemical, Incorporated, Calvert City, Ky.

Modaflow III: a flow control agent available from Synthron Inc., St. Louis Mo.

MPP 620F: a polyethelene wax, available from Micro Powders, Incorporated, Tarrytown, N.Y.

M5, MS-5, CT-1111G, CT-1110F, CT-1221, EH-5, TS-720: fumed silicas available from Cabot Corp., Tuscola, Ill.

Aluminiumoxid C: fumed alumina available from Degussa Corp., Parsippany, N.J.

HDK H-18, HDK T-30: fumed silicas available from Wacker Silicones Corporation, Adrian Mich.

The following test methods were used to characterize the films produced in the examples:

Canadian Standards Association (CSA) Z245.20-02-12.11 Flexibility Test

This test is a measurement of the ability to resist deformation during a change in dimension of the substrate by undergoing a bend at up to 3 degree per pipe diameter (3°/PD). ⅜" by 1" by 8" hot roll steel bar samples were first heated in a 221° C. oven for between thirty minutes and two hours. The samples were then removed and coated with between approximately 0.018 in. and approximately 0.023 in. of the composition. The bars were then post cured in an oven for approximately two minutes at 204° C. After removal from the oven, the bars were air cured for approximately one minute and then water quenched for approximately two minutes to reach room temperature. When the bars reached room temperature, they were placed in a −30° C. freezer for two hours. The bars were then bent using an automated bar bender at various degrees per pipe diameter and observed for cracking. The bar was bent such that the operation lasts no longer than ten seconds and is completed within thirty seconds of the bar having been removed from the freezer. Any cracks observed within the top half inch of the coating were disregarded.

Gouge Test

This test is a measurement of how deep the coating is penetrated given a specified load over a specified distance. The samples were tested at three temperatures: −30° C., 23° C., and 60° C. The 3M double cut shank was allowed to remain at the desired temperature for at least 30 minutes before testing. The samples were first clamped between the lower grips of an Instron 5500R Model 1122, and then secured with the desired torque within the device containing a double cut conical bur. The crosshead speed was set at 10 inches per minute and each gouge was 1 in. in length. The depth of penetration was measured in mils (thousandths of an inch).

ASTM G14-88 Impact Test

This test is a measurement of impact resistance exhibited by a sample coated with the composition. A fixed weight is vertically restrained and dropped from varying heights onto the sample to produce impact energies over a specified range. Adjacent testing heights were at fixed increments. Any cracks in the coating were detected by electrical inspection. If the coating film was penetrated on the initial drop, the next test was performed at a lower height. If the coating film was not penetrated on the initial drop, the second test was performed at a higher height. This procedure was repeated 20 times. The impact resistance was determined as the amount of energy required for penetrating the coating film.

Example 1 and Comparative Examples A, B, and C

Example 1 is a composition prepared in accordance with an exemplary embodiment of the present invention, with component concentrations (in weight percent) of EPON 2004, EPON 1001F, Dicyandiamid AB 04, Feldspar G-200, Nanostrength E-20, Epi-cure P103, SMC 1108, Ferroxide Brown 4171, Resiflow PL-200, MPP 620F, and Wacker HDK T30 as provided in Table 1. Comparative Examples A and B are comparative compositions with component concentrations (in weight percent) of EPON 2004, EPON 1001F, Dicyandiamid AB 04, Feldspar G-200, Nanostrength E-40 and M22, respectively, Epi-Cure P103, SMC 1108, Ferroxide Brown 4171, Resiflow PL-200, MPP 620F, and Wacker HDK T30 as provided in Table 1. Comparative Example C is a comparative composition, with component concentrations (in weight percent) of EPON 2004, EPON 1001F, Dicy, Feldspar G-200, Epi-Cure P103, SMC 1108, Ferroxide Brown 4171, Resiflow PL-200, MPP 620F, and Wacker HDK T30 as also provided in Table 1.

Example 1 and Comparative Examples A-C were made using a mixing and extruding process. A sample of the coating was prepared by dry blending the resins, curative, filler, tri-block copolymer, catalysts, pigments, and flow control agents to the correct weight percent in relation to Table 1, in a high shear mixer (Thermo Prism model #B21R 9054 STR/2041) at about 4000 revolutions per minute (rpm). In Example 1 and in Comparative Examples A and B, the tri-block copolymer was added in place of filler to keep the total composition at 100%. After premixing, the samples were melt-mixed using a twelve-inch co-rotating twin screw extruder model #MP-2019 15;1 with 17-90 blocks and 2-60 blocks at a throughput range from about 50-60 grams per minute. The extruded material was then ground and fumed silica was added to the desired weight percent. The final formulation was then blended again using a high shear mixer at 4000 rpm. After mixing, the material was screened using a sieve with a 60 mesh screen. The dry powder epoxy was then coated onto preheated (430° F.), grit blasted, near white metal finished, hot rolled steel surfaces using a fluidized bed. The coating was then coated to a thickness of about 0.02". The coated bars were then post cured for two minutes in a 400° F. oven and water quenched for two minutes.

Samples coated with the compositions of Example 1 and Comparative Examples A, B, and C were tested for flexibility at −30° C. Table 1 provides the composition concentrations and number of observed hard cracks in the coatings after being subjected to a 4 degree per pipe diameter (°/PD) bend test (even further than the 3°/PD upper end of the CSA Z245.20-02-12.11 Flexibility Test) as analyzed pursuant to the method discussed above, of Example 1 and Comparative Examples A, B, and C.

TABLE 1

| | Example 1, wt. % | Comp. Ex. A, wt. % | Comp. Ex. B, wt. % | Comp. Ex. C, wt. % |
|---|---|---|---|---|
| Phenol,4,4'-(1-methylethylidene) bis-polymer with 2,2'-[(1-methylethylidene) bis(4,1-phenylene oxymethylene)]bis[oxirane] | 47 | 47 | 47 | 47 |
| Curing agent | 0.69 | 0.69 | 0.69 | 0.69 |
| Calcium aluminum silicate | 40 | 40 | 40 | 50 |
| E-20 (SBM) 1:1:1 to 1:1:1.5 | 10 | 0 | 0 | 0 |
| E-40 (SBM) (3:1:2) | 0 | 10 | 0 | 0 |
| M-22 BA/MMA 3:2-2:1 (ABA) | 0 | 0 | 10 | 0 |
| 2-Methylimidazole | 0.45 | 0.45 | 0.45 | 0.45 |

TABLE 1-continued

|  | Example 1, wt. % | Comp. Ex. A, wt. % | Comp. Ex. B, wt. % | Comp. Ex. C, wt. % |
|---|---|---|---|---|
| Pigment | 1.33 | 1.33 | 1.33 | 1.33 |
| Flow control agent | 0.96 | 0.96 | 0.96 | 0.96 |
| Fumed silica (of total ground material) | 0.35 | 0.35 | 0.35 | 0.35 |
| Flexibility 4°/PD at −30° C. (Avg. No. of Cracks observed) | 0 | 14.7 | 21.7 | 27.3 |

The data provided in Table 1 illustrates the improved flexibility of Example 1 likely due to the addition of a tri-block copolymer having a concentration ratio of about 1:1:1 of polystyrene:polybutadiene:polymethylmethacrylate. While no hard cracks were observed in the coating of Example 1, there were numerous hard cracks observed in the coatings of Comparative Examples A-C. In particular, the coating of Comparative Example A exhibited 14.7 cracks. The coating of Comparative Example B exhibited 23.7 cracks, and the coating of Comparative C exhibited 27.4 cracks. A reason that the coating of Example 1 did not exhibit any hard cracks after being bent at approximately 4°/PD may be due in part to the presence of the Nanostrength SBM E-20 in the composition, and in particular, due to the presence and amount of butadiene in the Nanostrength SBM E-20.

A difference in the compositions of Example 1 and Comparative Examples A and B was the amount of tri-block copolymer having a concentration ratio of about 1:1:1 of polystyrene:polybutadiene:polymethylmethacrylate. The Nanostrength SBM E-40 of Comparative Example A did not provide increased flexibility likely due to the lower ratio of polybutadiene and higher ratio of polystyrene in the composition, which can be see in Table 1. The Nanostrength BA/MMA M-22 present in Comparative Example B also did not provide increased flexibility likely because it contained only methyl methacrylate and no butadiene. Comparative Example C did not contain any tri-block copolymer, and exhibited the greatest number of hard cracks.

Examples 2 and 3 and Comparative Example D

Examples 2 and 3 are compositions of the present invention, with component concentrations (in weight percent) of EPON 2004, EPON 1001F, Dicyandiamid AB 04, Feldspar G-200, Nanostrength E-20, Epi-Cure P103, SMC 1108, Ferroxide Brown 4171, Resiflow PL-200, MPP 620F, and Wacker HDK T30 as provided in Table 2. Comparative Example D is a comparative composition with component concentrations (in weight percent) of EPON 2004, EPON 1001F, Dicyandiamid AB 04, Feldspar G-200, Nanostrength SBM E-20, Epi-Cure P103, SMC 1108, Ferroxide Brown 4171, Resiflow PL-200, MPP 620F, and Wacker HDK T30 as provided in Table 2.

Examples 2 and 3 and Comparative Example D were made using the same method as Example 1 except that rather than adding the about 1:1:1 concentration ratio of polystyrene:polybutadiene:polymethylmethacrylate tri-block copolymer in place of the filler material, the tri-block copolymer was added in place of the epoxy resin.

Samples coated with the compositions of Examples 2 and 3 and Comparative Example D were tested for gouge resistance, flexibility, and thermal analysis (using a Differential Scanning Calorimetry (DSC) test). Table 2 provides the composition concentrations and the results for DSC, gouge and flexibility tests for Examples 2 and 3 and Comparative Example D.

TABLE 2

|  | Example 2, wt. % | Example 3, wt. % | Comp. Ex. D, wt. % |
|---|---|---|---|
| Phenol,4,4'-(1-methylethylidene) bis-polymer with 2,2'-[(1-methylethylidene)bis(4,1-phenylene oxymethylene)]bis[oxirane] | 42 | 32 | 47 |
| Curing agent | 0.62 | 0.48 | 0.69 |
| Calcium aluminum silicate | 50 | 60 | 50 |
| E-20 (SBM) 1:1:1 to 1:1:1.5 | 5 | 5 | 0 |
| 2-Methylimidazole | 0.45 | 0.45 | 0.45 |
| Pigment | 1.33 | 1.33 | 1.33 |
| Flow control agent | 0.96 | 0.96 | 0.96 |
| Fumed silica (of total ground material) | 0.35 | 0.35 | 0.35 |
| Tg1 | 56.77 | 56.81 | 56.5 |
| Tg2 | 105.54 | 105.67 | 105.83 |
| Gouge Depth at room temperature, mm | 8.5 | 9.5 | 90 |
| Flexibility 4°/PD at −30° C. (Avg. No. of Cracks observed) | 0 | 0 | 20.3 |

The glass transition temperature of the powder (Tg1) and the glass transition temperature of the coating Tg2 were unaffected by the addition of the about 1:1:1 concentration ratio of polystyrene:polybutadiene:polymethylmethacrylate tri-block copolymer, which can be seen from the data in Table 2 when comparing Examples 2 and 3 and Comparative Example D. The gouge depth was also unaffected by the addition of the about 1:1:1 concentration ratio of polystyrene:polybutadiene:polymethylmethacrylate tri-block copolymer. The differences in the gouge depths were relatively negligible when tested at room temperature. The flexibility characteristics of the coatings were affected by the addition of the about 1:1:1 concentration ratio of polystyrene:polybutadiene:polymethylmethacrylate tri-block copolymer. An increase in flexibility was observed from 20 hard cracks to 0 hard cracks for Examples 2 and 3 with the addition of 5% tri-block copolymer. Thus, adding a tri-block copolymer having about 1:1:1 concentration ratio of polystyrene:polybutadiene:polymethylmethacrylate can increase the flexibility of coatings without negatively affecting other properties, such as glass transition temperature and gouge depth.

Example 4 and Comparative Example E

Example 4 is a composition of the present invention, with component concentrations (in weight percent) of EPON 2004, EPON 1001F, D.E.H. 85, Feldspar G-200, Nanostrength E-20, Epi-Cure P103, SMC 1108, Ferroxide Brown 4171, Resiflow PL-200, MPP 620F, and Wacker HDK T30 as provided in Table 3. Comparative Example E is a comparative composition, with component concentrations (in weight percent) of EPON 2004, EPON 1001F, D.E.H. 85, Feldspar G-200, Epi-Cure P103, SMC 1108, Ferroxide Brown 4171, Resiflow PL-200, MPP 620F, and Wacker HDK T30, as also provided in Table 3. Example 4 and Comparative Example E were prepared using the same method as discussed above for Example 1.

Samples coated with the compositions of Example 4 and Comparative Example E were tested for impact and flexibility. Table 3 provides the concentrations of materials in the compositions in weight percent and impact resistance of the coatings using the ASTM G14-88 impact resistance test, as analyzed pursuant to the method discussed above, for samples coated with the compositions of Example 4 and Comparative Example E.

TABLE 3

|  | Example 4, wt. % | Comp. Ex. E, wt. % |
|---|---|---|
| Phenol,4,4'-(1-methylethylidene) bis-polymer with 2,2'-[(1-methylethylidene)bis(4,1-phenylene oxymethylene)]bis[oxirane] | 37 | 39 |
| Curing agent | 7.4 | 8 |
| Calcium aluminum silicate | 50 | 50 |
| E-20 (SBM) 1:1:1 to 1:1:1.5 | 3 | 0 |
| 2-Methylimidazole | 0.45 | 0.45 |
| Pigment | 1.33 | 1.33 |
| Flow control agent | 1.36 | 1.36 |
| Fumed silica (of total ground material) | 0.35 | 0.35 |
| Impact Energy, in * lbs | 129 | 88 |
| Flexibility 4°/PD at −30° C. (Avg. No. of Cracks observed) | 1.3 | 21 |

After it was determined that the about 1:1:1 concentration ratio of polystyrene:polybutadiene:polymethylmethacrylate tri-block copolymer exhibited increased flexibility without negatively affecting abrasion resistance through gouge tests and glass transition temperature, the impact energy of the composition was determined as compared to a coating similar in composition to a current damage resistant coating. As can be seen by the impact energy results shown in Table 3, Example 4 has at least as good as or better impact energy than the composition of Comparative Example E. The impact energy of the coating composition of Example 4 was unaffected (or slightly better) likely due to the addition of the tri-block copolymer.

It is also noted that examples 1-4 all comply with the CSA Z245.20-02-12.11 Flexibility Test (3°/PD at −30° C.), while some minor cracking was observed at 4°/PD at −30° C. for some examples.

Example 5-14 and Comparative Example F

Examples 5-14 are compositions of the present invention, with component concentrations (in weight percent) of EPON 2004, Dicyandiamid AB 04, Feldspar G-200, Nanostrength E-20, Epi-Cure P103, SMC 1108, Ferroxide Brown 4171, Resiflow PL-200, MPP 620F, Cabot M5, Cabot MS-5, Cabot CT-1111G, Cabot CT-110F, Cabot CT-1221, Aluminiumoxid C,EH-5, TS-720, HDK H-18, and Wacker HDK T30 as provided in Table 4, with each example having a different fluidizing agent type as shown in Table 5. Comparative Example F is a comparative composition with component concentrations (in weight percent) of EPON 2004, Dicyandiamid AB 04, Feldspar G-200, Nanostrength SBM E-20, Epi-Cure P103, SMC 1108, Ferroxide Brown 4171, Resiflow PL-200, MPP 620F, and Cabot M5 as provided in Table 4.

Examples 5-14 and Comparative Example F were made using the same method as Example 2 except that the preheat temperature of the bars was 460° F. and the experimental sample was coated as a dual layer coating over Scotchkote 6233 coated to a thickness of 0.006 inches.

Samples coated with the compositions of Examples 5-14 and Comparative Example F were tested for flexibility. Table 4 provides the composition concentrations and Table 5 provides the results for flexibility test for Examples 5-14 and Comparative Example F.

TABLE 4

|  | Example 5-14, wt. % | Comp. Ex. F, wt. % |
|---|---|---|
| Phenol,4,4'-(1-methylethylidene) bis-polymer with 2,2'-[(1-methylethylidene)bis(4,1-phenylene oxymethylene)]bis[oxirane] | 42 | 47 |
| Curing agent | 0.7 | 0.69 |
| Calcium aluminum silicate | 50 | 50 |
| E-20 (SBM) 1:1:1 to 1:1:1.5 | 5 | 0 |
| 2-Methylimidazole | 0.45 | 0.45 |
| Pigment | 1.33 | 1.33 |
| Flow control agent | 0.56 | 0.56 |
| Fluidizing agent (of total ground material) | 0.35 | 0.35 |

TABLE 5

|  | Fluidizing Agent (0.35 wt. %) | Flexibility 4°/PD at −30° C. (Avg. No. of Cracks observed) |
|---|---|---|
| Comp. Ex. F | Cabot M5 | 20.33 |
| Example 5 | Cabot M5 | 3.33 |
| Example 6 | MS-5 | 0.33 |
| Example 7 | CT-1111G | 0 |
| Example 8 | CT-1110F | 0 |
| Example 9 | CT-1221 | 0 |
| Example 10 | Aluminiumoxid C | 0 |
| Example 11 | EH-5 | 0.33 |
| Example 12 | TS-720 | 0 |
| Example 13 | HDK H-18 | 0 |
| Example 14 | HDK T-30 | 0 |

The flexibility characteristics of the coatings were affected by the addition of the about 1:1:1 concentration ratio of polystyrene:polybutadiene:polymethylmethacrylate tri-block copolymer. An increase in flexibility was observed from 20 hard cracks to 0-3 hard cracks for Examples 5-14 with the addition of 5% tri-block copolymer. Thus, adding a tri-block copolymer having about 1:1:1 concentration ratio of polystyrene:polybutadiene:polymethylmethacrylate can increase the flexibility of coatings. In addition, the flexibility is relatively independent of the type of fluidizing agent being used.

Example 15-20 and Comparative Example G

Examples 15-20 are compositions of the present invention, with component concentrations (in weight percent) of EPON 2004, Dicyandiamid AB 04, Feldspar G-200, Vansil W 20, Wollastokup, Huberbrite 10, Zeeospheres G-800, Zeeospheres G-600 Nanostrength E-20, Epi-Cure P103, SMC 1108, Ferroxide Brown 4171, Resiflow PL-200, MPP 620F, and Aluminiumoxid C as provided in Table 6, with each example having a different type of filler as shown in Table 7. Comparative Example G is a comparative composition with component concentrations (in weight percent) of EPON 2004, Dicyandiamid AB 04, Feldspar G-200, Nanostrength SBM E-20, Epi-Cure P103, SMC 1108, Ferroxide Brown 4171, Resiflow PL-200, MPP 620F, and Aluminiumoxid C as provided in Table 6.

Examples 15-20 and Comparative Example G were made using the same method as Examples 5-14. Samples coated with the compositions of Examples 15-20 and Comparative Example G were tested for flexibility. Table 6 provides the composition concentrations and Table 7 provides the results for flexibility test for Examples 15-20 and Comparative Example G.

TABLE 6

| | Example 15-20, wt. % | Comp. Ex. G, wt. % |
|---|---|---|
| Phenol,4,4'-(1-methylethylidene) bis-polymer with 2,2'-[(1-methylethylidene)bis(4,1-phenylene oxymethylene)]bis[oxirane] | 42 | 47 |
| Curing agent | 0.6 | 0.66 |
| Filler | 50 | 50 |
| E-20 (SBM) 1:1:1 to 1:1:1.5 | 5 | 0 |
| 2-Methylimidazole | 0.45 | 0.45 |
| Pigment | 1.33 | 1.33 |
| Flow control agent | 0.56 | 0.56 |
| Fluidizing agent (of total ground material) | 0.35 | 0.35 |

TABLE 7

| | Filler Material (50 wt. %) | Flexibility 4°/PD at −30° C. (Avg. No. of Cracks observed) |
|---|---|---|
| Comp. Ex. G | Feldspar | 27 |
| Example 15 | Feldspar | 10.33 |
| Example 16 | Vansil W-20 | 15.66 |
| Example 17 | Wollastokup | 14.33 |
| Example 18 | Huberbrite 10 | 19.33 |
| Example 19 | Zeeospheres G-800 | 9.66 |
| Example 20 | Zeeospheres G-600 | 2.66 |

The flexibility characteristics of the coatings were affected by the addition of the about 1:1:1 concentration ratio of polystyrene:polybutadiene:polymethylmethacrylate tri-block copolymer. An increase in flexibility was observed from 27 hard cracks to 2-20 hard cracks for Examples 15-20 with the addition of 5% tri-block copolymer. Thus, adding a tri-block copolymer having about 1:1:1 concentration ratio of polystyrene:polybutadiene:polymethylmethacrylate can increase the flexibility of coatings with the ability to use various fillers.

Example 21-28 and Comparative Example H

Examples 21-28 are compositions of the present invention, with component concentrations (in weight percent) of EPON 2004, Dicyandiamid AB 04, Feldspar G-200, Nanostrength E-20, Epi-Cure P103, SMC 1108, Ferroxide Brown 4171, Resiflow PL-200, Modaflow III, BYK 360P, Resiflow PH-240, Resiflow PH-241, Resiflow P-65F, Octoflow St-70, Resiflow LFMBE-6, PF 67, MPP 620F, and Aluminiumoxid C as provided in Table 8, with each example having a different flow control agent type as shown in Table 9. Comparative Example H is a comparative composition with component concentrations (in weight percent) of EPON 2004, Dicyandiamid AB 04, Feldspar G-200, Nanostrength SBM E-20, Epi-Cure P103, SMC 1108, Ferroxide Brown 4171, Resiflow PL-200, MPP 620F, and Wacker HDK t-30 as provided in Table 8.

Examples 21-28 and Comparative Example H were made using the same method as Examples 5-14. Samples coated with the compositions of Examples 21-28 and Comparative Example H were tested for flexibility. Table 8 provides the composition concentrations and Table 9 provides the results for flexibility test for Examples 21-28 and Comparative Example H.

TABLE 8

| | Example 21-28, wt. % | Comp. Ex. H, wt. % |
|---|---|---|
| Phenol,4,4'-(1-methylethylidene) bis-polymer with 2,2'-[(1-methylethylidene)bis(4,1-phenylene oxymethylene)]bis[oxirane] | 42 | 47 |
| Curing agent | 0.6 | 0.66 |
| Filler | 50 | 50 |
| E-20 (SBM) 1:1:1 to 1:1:1.5 | 5 | 0 |
| 2-Methylimidazole | 0.45 | 0.45 |
| Pigment | 1.33 | 1.33 |
| Flow control agent | 0.96 | 0.96 |
| Fluidizing agent (of total ground material) | 0.35 | 0.35 |

TABLE 9

| | Flow Control Agent (0.96 wt. %) | Flexibility 4°/PD at −30° C. (Avg. No. of Cracks observed) |
|---|---|---|
| Comp. Ex. H | PF 67 | 10 |
| Example 21 | PF 67 | 2 |
| Example 22 | Modaflow III | 3 |
| Example 23 | Resiflow PH-240 | 1.66 |
| Example 24 | Resiflow PH-241 | 3.66 |
| Example 25 | PL-200 | 2.66 |
| Example 26 | Resiflow P-65F | 1 |
| Example 27 | Octoflow St-70 | 2.66 |
| Example 28 | Resiflow LFMBE-6 | 1.66 |

The flexibility characteristics of the coatings were affected by the addition of the about 1:1:1 concentration ratio of polystyrene:polybutadiene:polymethylmethacrylate tri-block copolymer. An increase in flexibility was observed from 10 hard cracks to 1-4 hard cracks for Examples 21-28 with the addition of 5% tri-block copolymer. Thus, adding a tri-block copolymer having about 1:1:1 concentration ratio of polystyrene:polybutadiene:polymethylmethacrylate can increase the flexibility of coatings with the ability to use various flow control agents.

Although the present invention has been described with reference to preferred embodiments, workers skilled in the art will recognize that changes may be made in form and detail without departing from the scope of the invention.

The invention claimed is:

1. A method of protecting an article from extreme environmental conditions, the article comprising at least one of steel pipes, valves, pumps, tapping saddles, manifolds, pipe hangers, ladders, rebar, mesh, cable and wire rope, I-beams, column coils, anchor plates, and chairs, the method comprising:
    coating the article with a composition comprising:
        from about 20 wt % to about 80 wt % of a cross-linkable epoxy resin, based on the total weight of the composition; from about 1 wt % to about 20 wt % of a polystyrene-polybutadiene-polymethylmethacrylate tri-block copolymer, based on the total weight of the composition, having a concentration ratio of from about 1:1:1 to about 1:1:1.5; and
        from about 0.001 wt % to about 65 wt % of a filler material, based on the total weight of the composition; and
    curing the composition while disposed on the article to form a protected article, wherein the coating complies with the CSA Z245.20-02-12.11 Flexibility Test at −30°C.

2. The method of claim 1, wherein said composition comprises: from about 35 wt % to about 70 wt % of said cross-linkable resin, based on the total weight of the composition;

from about 5 wt % to about 15 wt % of said tri-block copolymer, based on the total weight of the composition; and from about 30 wt % to about 60 wt % of said filler, based on the total weight of the composition.

3. The method of claim 1, wherein said composition comprises: from about 30 wt % to about 70 wt % of said cross-linkable resin, based on the total weight of the composition; from about 5 wt % to about 15 wt % of said tri-block copolymer, based on the total weight of the composition; and from about 30 wt % to about 60 wt % of said filler, based on the total weight of the composition.

4. The method of claim 3, wherein said composition further comprises from about 0.69 wt % to about 5 wt % of a curing agent, based on the total weight of the composition.

5. The method of claim 1, wherein said composition comprises: from about 50 wt % to about 80 wt % of said cross-linkable resin, based on the total weight of the composition; from about 5 wt % to about 15 wt % of said tri-block copolymer, based on the total weight of the composition; and from about 3 wt % to about 30 wt % of said filler, based on the total weight of the composition.

6. The method of claim 5, wherein said composition further comprises from about 0.69 wt % to about 15 wt % of a curing agent, based on the total weight of the composition.

7. A protected article comprising: an article having an outer surface, the article comprising at least one of steel pipes, valves, pumps, tapping saddles, manifolds, pipe hangers, ladders, rebar, mesh, cable and wire rope, I-beams, column coils, anchor plates, and chairs; and a coating disposed on at least a portion of the outer surface, wherein the coating is a cured product of a composition comprising:

from about 20 wt % to about 80 wt % of a cross-linkable epoxy resin, based on the total weight of the composition;

from about 1 wt % to about 20 wt % of a polystyrene-polybutadiene-polymethylmethacrylate tri-block copolymer, based on the total weight of the composition, having a concentration ratio of from about 1:1:1 to about 1:1:1.5; and from about 0.001 wt % to about 65 wt % of a filler material, based on the total weight of the composition;

wherein the coating complies with the CSA Z245.20-02-12.11 Flexibility Test at –30°C.

8. The protected article of claim 7, wherein said composition comprises: from about 35 wt % to about 70 wt % of said cross-linkable resin, based on the total weight of the composition; from about 5 wt % to about 15 wt % of said tri-block copolymer, based on the total weight of the composition; and from about 30 wt % to about 60 wt % of said filler, based on the total weight of the composition.

9. The protected article of claim 7, wherein said composition comprises: from about 30 wt % to about 70 wt % of said cross-linkable resin, based on the total weight of the composition; from about 5 wt % to about 15 wt % of said tri-block copolymer, based on the total weight of the composition; and from about 30 wt % to about 60 wt % of said filler, based on the total weight of the composition.

10. The protected article of claim 9, wherein said composition further comprises from about 0.69 wt % to about 5 wt % of a curing agent, based on the total weight of the composition.

11. The protected article of claim 7, wherein said composition comprises: from about 50 wt % to about 80 wt % of said cross-linkable resin, based on the total weight of the composition; from about 5 wt % to about 15 wt % of said tri-block copolymer, based on the total weight of the composition; and from about 3 wt % to about 30 wt % of said filler, based on the total weight of the composition.

12. The protected article of claim 11, wherein said composition further comprises from about 0.69 wt % to about 15 wt % of a curing agent, based on the total weight of the composition.

13. The protected article of claim 7, wherein the article comprises steel.

14. The protected article of claim 7, wherein the coating does not crack as the article is bent.

* * * * *

UNITED STATES PATENT AND TRADEMARK OFFICE
CERTIFICATE OF CORRECTION

PATENT NO. : 7,670,683 B2  
APPLICATION NO. : 11/609483  
DATED : March 2, 2010  
INVENTOR(S) : Meghan L. Mallozzi et al.

Page 1 of 1

It is certified that error appears in the above-identified patent and that said Letters Patent is hereby corrected as shown below:

Column 1,  
Line 44, delete "disbandment" and insert -- disbondment -- therefor.

Column 3,  
Line 62, delete "101F" and insert -- 100F -- therefor.

Column 4,  
Line 26, delete "dicyandiamids, imadazoles" and insert -- dicyandiamides, imidazoles -- therefor.  
Line 51, delete "dimethylamineomethyl" and insert -- dimethylaminomethyl -- therefor.  
Line 60, delete "Calver" and insert -- Calvert -- therefor.  
Lines 62-63, delete "polytetraflouroethylene" and insert -- polytetrafluoroethylene -- therefor.

Column 6,  
Line 42, delete "Wilsboro" and insert -- Willsboro -- therefor.  
Line 58, delete "BA/AMMA" and insert -- BA/MMA -- therefor.

Column 7,  
Line 7, delete "polythelene" and insert -- polyethylene -- therefor.

Column 9,  
Line 36, delete "see" and insert -- seen -- therefor.

Column 11,  
Line 47, delete "CT-110F" and insert -- CT-1110F -- therefor.

Signed and Sealed this  
Fourth Day of January, 2011

David J. Kappos  
*Director of the United States Patent and Trademark Office*